(No Model.)

A. BELDING.
DEVICE FOR HANGING SEED CORN.

No. 276,755. Patented May 1, 1883.

WITNESSES

INVENTOR
Arthur Belding
per M. E. Dayton
Attorney

UNITED STATES PATENT OFFICE.

ARTHUR BELDING, OF CHICAGO, ILLINOIS.

DEVICE FOR HANGING SEED-CORN.

SPECIFICATION forming part of Letters Patent No. 276,755, dated May 1, 1883.

Application filed June 5, 1882. (No model.)

*To all whom it may concern:*

Be it known that I, ARTHUR BELDING, of the city of Chicago, in the county of Cook and State of Illinois, have invented certain new and useful Improvements in Devices for Hanging Seed-Corn; and I do hereby declare that the following is a full, clear, and exact description thereof, reference being had to the accompanying drawings, and to the letters of reference marked thereon, which form a part of this specification.

My invention relates to a device by which ears of seed-corn may be suspended for the purpose of drying them.

The object of my invention is to provide inexpensive means for expeditiously attaching ears of corn to hooks, to so construct these hooks that they may be fastened to a suspending-wire with especial security, and to so construct the suspending-wire that the hooks may all be removed together without taking down the wire.

To these ends the invention consists, first, of a metal hook having a shank provided with one or more barbs and adapted to be inserted into the base of the corn-cob, after which the hook serves as a means for stringing the ear of corn upon the suspending-wire; second, of such a barbed shank provided with a spiral hook for securing it to the suspending-wire, whereby the ears may be readily and independently attached thereto or detached therefrom, while at the same time the danger of accidental detachment from the suspending-wire is avoided; and, third, of a combination, with the corn-hooks, of a suspending-wire provided at its lower end with a nut or its equivalent for the support of said hooks, by the removal of which nut the hooks are allowed to slip off the wire.

Figure 1:
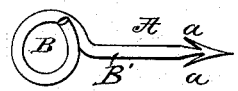
Figure 2:
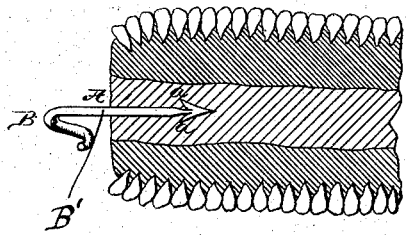
Figure 4:
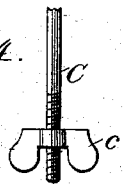
Figure 3:
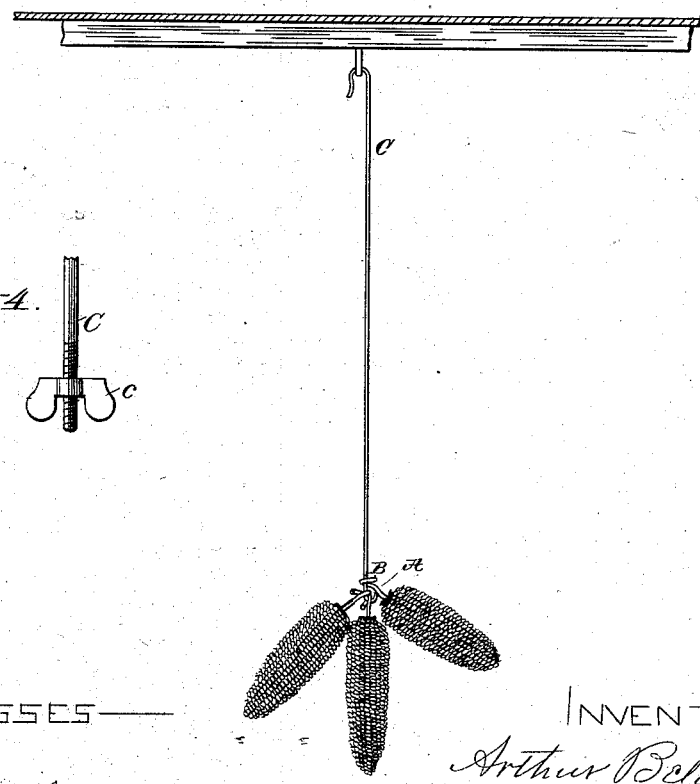

Figure 1 of the accompanying drawings shows the hook detached. Fig. 2 shows the hook inserted in a corn-ear. Fig. 3 shows several ears of corn attached to a suspending-wire. Fig. 4 illustrates a removable nut applied to the lower end of the suspending-wire, as a detachable support or fastening for the hooks.

In these drawings, A is a corn-hook, of metal—as iron wire, for example—provided with one or more barbs, $a$, at one end of its shank B', and with the hook proper, B, at the other. The extreme end of the wire beyond the barbs is pointed, or sufficiently small to allow it to be readily inserted into the end of an ear of corn by a direct thrust, and when so inserted the barbs retain the shank within the cob. By means of the hook any number of ears may be applied to a suspending-wire, C, in the manner shown in Fig. 3. If desired to give firmer attachment of the hook within the cob or corn-ear, the shank may, after being inserted, be rotated slightly; but this will not usually be necessary.

The hook B is preferably of the spiral form shown in Fig. 2, where the end of the hook curves around past and at a sufficient distance from the shank to admit the suspending-wire. Inasmuch as in this form the hook requires a partial turn of the ear from its natural hanging position to attach it to or detach it from the suspending-wire, the accidental detachment of the ear is practically impossible.

I am aware that hooks have been made which may be screwed into the cob; but by the use of the barbed shank described the hook may be attached to the corn-ear much more expeditiously and quite as securely.

I am also aware that barbed or harpoon-shaped points are common in various devices for retaining objects pierced thereby. I do not therefore claim this feature of construction by itself. Thus, to particularize, I am acquainted with the tobacco-hanger described in Letters Patent granted August 19, 1873, to one Strong, and numbered 141,899, wherein the horizontal arm or shank of the suspending device is provided with a harpoon-point. This is not my invention, which embraces not only the straight shank provided with the harpoon-point, but also the eye, formed of the same piece with the shank, and adapted to be applied and retained upon a vertically-suspended wire, as shown. In short, I restrict myself to the structure described as a whole, and as hereinafter specified in the appended claims.

In the use of my devices the suspending-wire C is usually fastened by one end to the rafters or ceiling of a barn or building and hangs pendent, the hooks being held from slipping off the wire by a nut or other means. In Fig. 4 the lower end of the suspending-wire C is shown provided with a thumb-nut, c, screw-threaded thereon, and of proper size to prevent the hooks B from slipping off said wire. The object of supporting the hooks upon the suspending-wire by a nut, instead of by a bend in the suspending-wire itself, is to enable a person to remove all the ears at once without taking down the suspending-wire. This is obviously accomplished by simply removing the nut, when the ears are free to fall. A pin passed through the lower end of the suspending-rod will be the equivalent of the nut.

I claim as my invention—

1. The hook described for hanging seed-corn, consisting of an eye, B, adapted to receive and retain the suspending-wire C, and a shank, B', having one or more barbs, a, whereby the shank may be secured to the corn-ear by a direct thrust, substantially as described.

2. The seed-corn hook described, having a straight barbed shank and the spiral open eye, substantially as and for the purpose specified.

3. In combination with the seed-corn hooks, a suspending-rod having a detachable fastening at its lower end for retaining the hooks thereon, substantially as described.

In testimony that I claim the foregoing as my invention I affix my signature in presence of two witnesses.

ARTHUR BELDING.

Witnesses:
M. E. DAYTON,
JESSE COX, Jr.